Nov. 8, 1932.  J. W. THROPP  1,887,443
ROLL TRAVEL TESTING APPARATUS
Filed Nov. 7, 1930   3 Sheets-Sheet 2
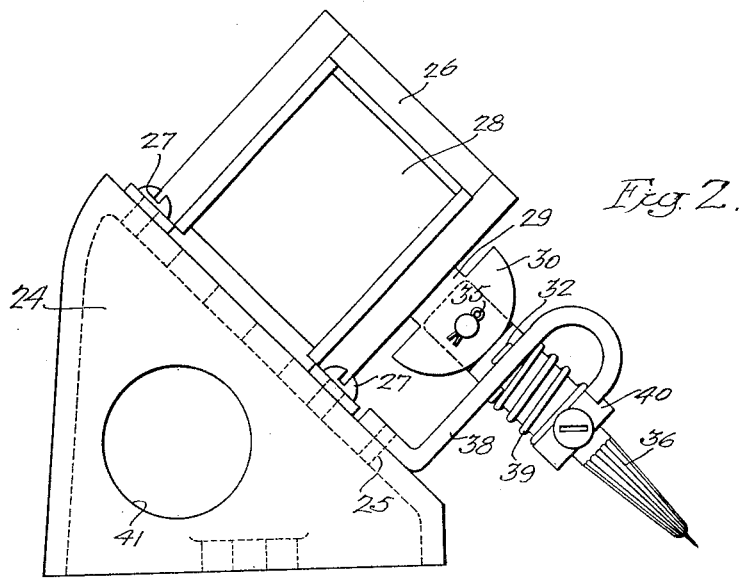
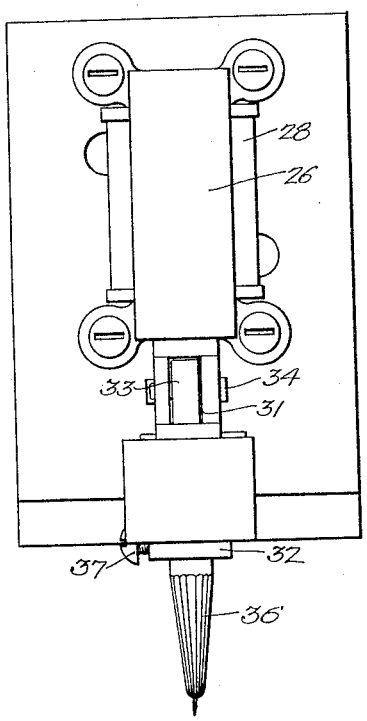
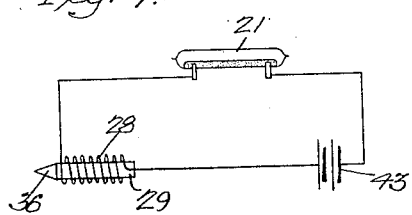
Inventor:
Joseph W. Thropp
by his Attorneys
Howson & Howson

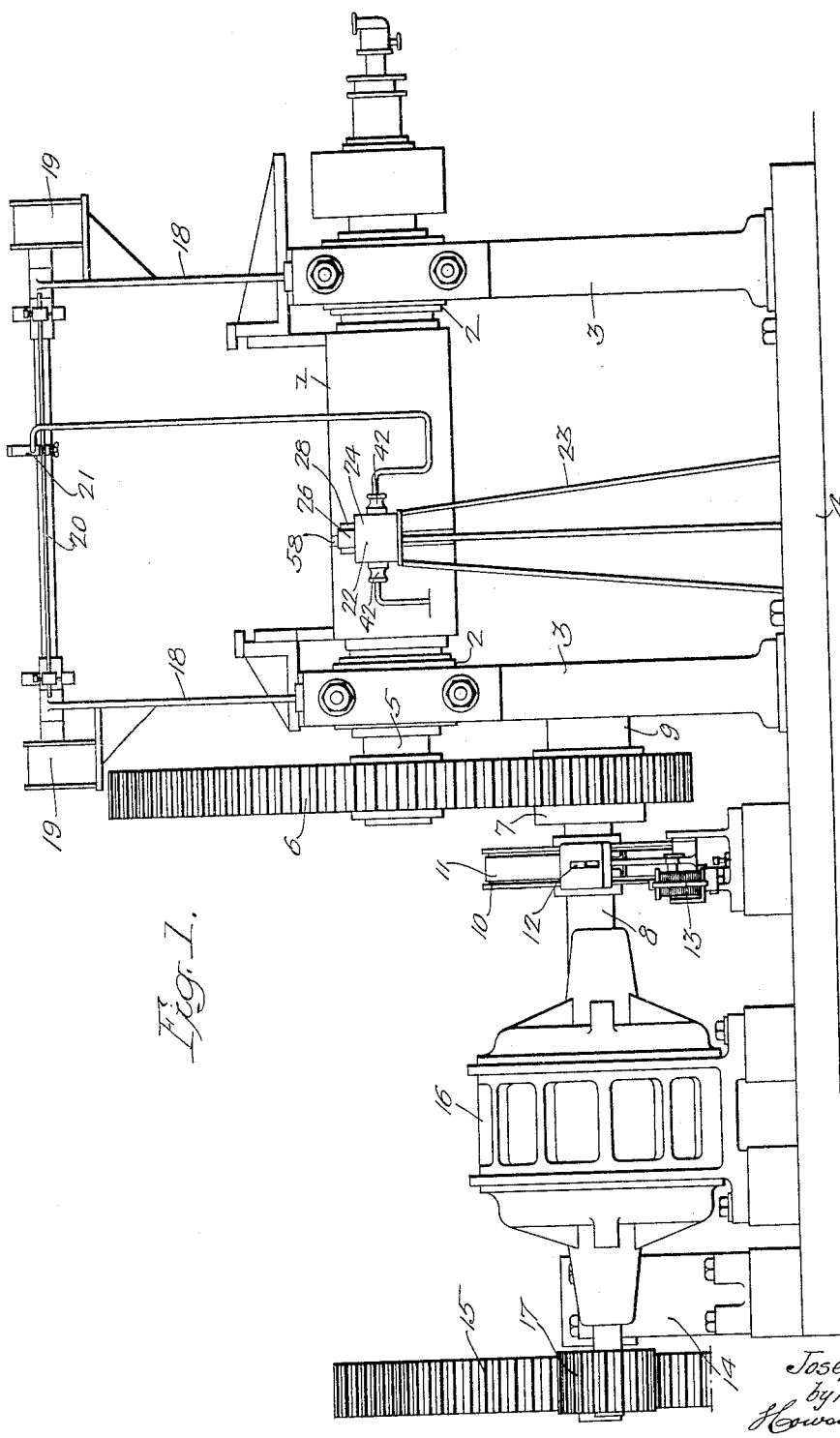

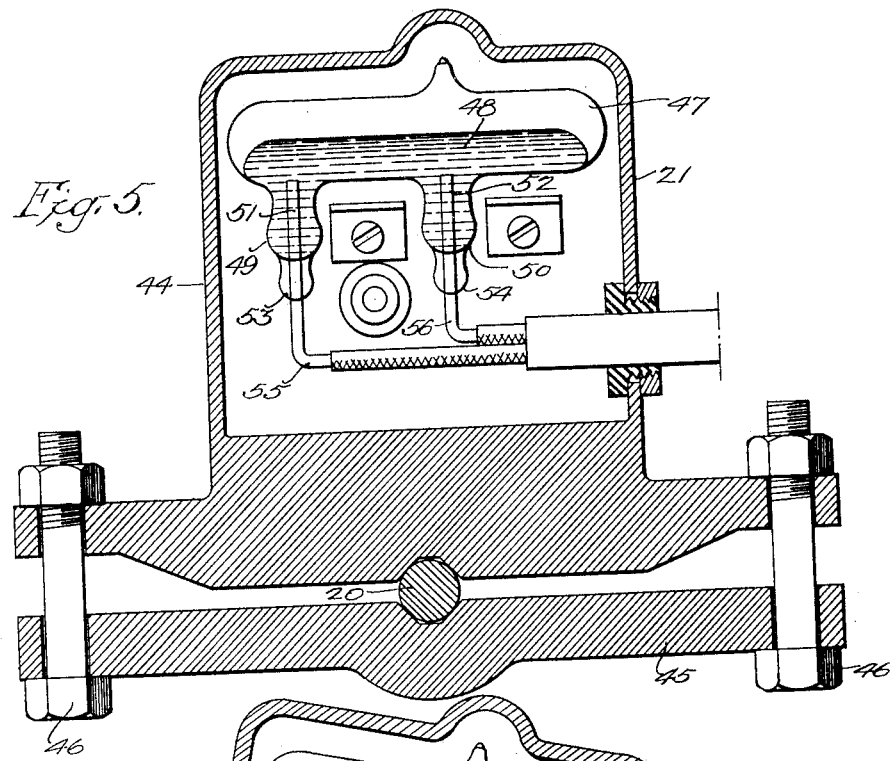
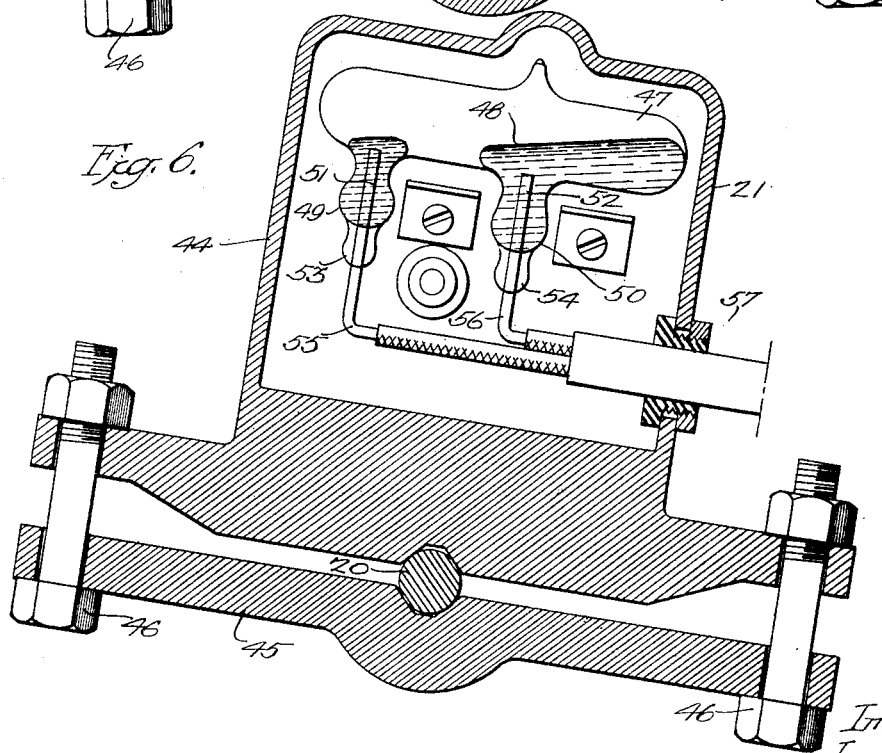

Patented Nov. 8, 1932

1,887,443

UNITED STATES PATENT OFFICE

JOSEPH W. THROPP, OF TRENTON, NEW JERSEY

ROLL TRAVEL TESTING APPARATUS

Application filed November 7, 1930. Serial No. 494,121.

This invention relates to means for testing and measuring the travel of certain machine parts, such as rotating rolls, after the machine has been rendered inoperative by the shutting off of, or otherwise rendering ineffective, the source of energy for the machine. The device of the invention is particularly adapted for use with machines such as rubber mixing machines, and is illustrated in the present instance as being associated with such a machine. However, it is to be understood that the invention is applicable to any machine with which it may be associated to perform its desired function.

As is generally known, there are certain rules and regulations imposed by various authorities upon the travel of rotating rolls or the like after a machine has been shut down and the brake applied. Safety is perhaps the chief reason for such regulations, it being desired to stop such rolls as quickly as possible when the machine is shut down in an emergency, such as, for example, when an operator gets caught therein. Accordingly, it is the object of this invention to provide simple and efficient means for accurately testing the travel of rotating rolls or the like from the time the machine is shut down until its brake completely stops it, thereby stopping the rolls. Such means will readily enable the determination of whether or not the regulations referred to are being complied with in any particular instance.

It is a further object of the invention to provide means of the type indicated which comprises a portable outfit that may be conveniently carried about from one installation of machinery to another. The device comprises essentially a spring and solenoid controlled marking device, and a cradle switch mounted on a control element of the machine and adapted to control the solenoid circuit in accordance with the position of such element.

The details of construction of a device constructed in accordance with the principles of the invention, as well as the method of using and operating the same, will be clearly understood from the following description and the accompanying drawings.

In the drawings:

Fig. 1 is an elevational view of a rubber-mixing machine having associated therewith the device of my invention;

Fig. 2 is a side elevational view of the spring and solenoid controlled marking device of the invention;

Fig. 3 is a plan view of the device of Fig. 2;

Fig. 4 is a view showing diagrammatically the circuit connections of the device;

Fig. 5 is a sectional view of the cradle switch of my invention in closed position; and Fig. 6 is a view similar to Fig. 5 of the switch in open position.

Referring to Fig. 1, there is shown a rubber-mixing machine which may be of the type disclosed and described in detail in my prior Patent No. 1,621,442, dated March 15, 1927. For the purpose of the present invention, it will be sufficient to describe briefly the machine disclosed, reference being had to the aforementioned patent for a more detail description of the machine, if such is desired. In the figure, there is illustrated a mixing roll 1 which is one of a pair of horizontally adjacent rolls adapted to mix or grind material passing therebetween. Roll 1 is journaled in bearings 2, which are supported by vertical standards 3. These standards are, in turn, mounted upon the base plate or frame 4 of the machine. One of the rolls referred to, for example roll 1, is provided with a projecting shaft 5, which carries at its end a large gear 6. Gear 6 meshes with, and is driven by, a pinion 7 mounted on one end of shaft 8. Shaft 8 is journaled at one end in bearing 9 mounted on standard 3 and carries a brake drum 10. Brake lining 11 is operatively associated with the brake drum, and is adapted to be brought into operative relation with the said drum through the medium of a weighted brake arm 12 and a solenoid 13. The manner in which the brake of the machine is actuated forms no part of the present invention and a description thereof is unnecessary here. Such operation may be determined in detail from the disclosure of the aforementioned patent.

The other end of shaft 8 is journaled in bearing 14 mounted on the base plate, and carries a large gear 15. A suitable electric motor 16 is provided to drive the machine, and carries at one end of its shaft a pinion 17 which meshes with gear 15.

Standards 3 carry at their upper ends vertical supporting rods 18. A pair of switches 19 are carried by the supporting rods, and a pair of horizontally disposed rods 20 (one being hidden from view) are pivotally supported and adapted to actuate switches 19 to open them when moved down. Switches 19 may be connected in the under voltage release coil of the circuit breaker provided in the circuit of the driving motor. A complete circuit diagram including these switches, and showing the manner in which they co-operate with the remainder of the electrical system, will be found in the disclosure of the aforementioned patent. For the purpose of the present invention, it suffices to state that rods 20 are provided so that the operator may quickly shut down the machine in an emergency by merely reaching up and moving the rods. If the operator should have a portion of his body or clothing caught in the rolls, for example, he can readily stop the machine by means of the rods.

In accordance with my invention, I provide a cradle switch 21, which may take the form shown clearly in Figs. 5 and 6 and described hereinafter. This switch may be mounted upon one of the horizontal rods 20 by providing a suitable bracket for such mounting. The switch is so mounted with respect to the rod that it is closed when switches 19 are closed, but opens simultaneously with switches 19. A marking device, indicated generally by reference character 22, is also provided and may be positioned adjacent roll 1. This device is connected electrically with cradle switch 21, as will appear more clearly hereinafter. Such device may be mounted in the desired position adjacent the roll by means of a tripod 23, or any other suitable support.

Referring to Figs. 2 and 3 for the details of construction of the marking device, such device is provided with a supporting housing 24, which also serves as an outlet box for conductors and is adapted to be mounted upon the tripod. This housing has its upper wall angularly disposed as at 25. A solenoid enclosing yoke 26 is mounted upon the said upper wall by means of suitable screws 27, or the like. This yoke carries the coil of a solenoid 28, which also comprises an armature 29 adapted to be actuated by the solenoid coil. The armature is shaped at its lower end as indicated at 30, and has its lower end recessed as at 31 (see Fig. 3). A pencil-holding member 32 has its upper end 33 received by the recess 31, and such member is attached to the armature by means of a suitable pin 34 and cotter pin 35. The lower end of this member is adapted to receive a pencil or other suitable marking device 36, which may be firmly secured in its holding member by means of set screw 37. A bracket 38 is also attached to the upper wall of housing 24, and contains an opening through which the holder for the marking device passes. A coil spring 39 is disposed between a collar 40 on the end of the pencil-holding member and bracket 38.

It will be apparent that normally with the solenoid deenergized, spring 34 will assist the force of gravity in urging pencil 36 downward. Such downward motion will be limited, however, by the lower end of the armature abutting against bracket 38. When the solenoid is energized, it functions to draw its armature and the pencil upward against the action of the spring. The upward motion is limited by the enlarged lower end of the armature striking against yoke 26.

Housing 24 of the device is provided with socket receptacles 41 in each of its side walls. Such receptacles are adapted to receive plugs 42, as shown clearly in Fig. 1. Fig. 4 shows schematically the wiring diagram of the device. As shown therein, cradle switch 21 and the coil of solenoid 28 are connected in series with any suitable source of electrical energy 43. If desired, a separate source, such as a battery, may be used in the circuit of the device. Alternately, if the source of energy used to actuate the driving motor of the mixing machine is suitable, it may be used in the circuit of the testing device.

Figs. 5 and 6 show the details of construction of the cradle switch. This switch may comprise a housing 44, whose bottom is shaped to cooperate with a clamping member 45 to rigidly mount the switch upon rod 20 by means of suitable bolts 46 or the like. A sealed envelope 47, which may be of glass, is mounted within the housing and carries a pool of mercury 48. The envelope is formed to provide depressions 49 and 50 into which suitable electrodes 51 and 52 extend. The electrodes enter the envelope through hermetically sealed ends 53 and 54. A pair of conductors 55 and 56, contained in a single cable, connect the electrodes to plug 42 (Fig. 1). An insulating bushing 57 may be provided where the cable passes through the housing.

With the switch in the position shown in Fig. 5, which corresponds to closed position of switches 19, the mercury contacts both electrodes and forms a conducting path therebetween, thus maintaining the circuit closed. When rod 20 is moved, however, the switch assumes the position shown in Fig. 6, the mercury separating to open the circuit. It is important that the switch be so positioned that the mercury opens the circuit simultaneously with the opening of switches 19.

Referring again to Fig. 1 and considering the operation of the device, it will be apparent from that figure that motor 16 is adapted to drive shaft 8 through the medium of gears 15 and 17. Shaft 8, in turn, drives the rolls of the mixing machine through the medium of gears 6 and 7. If it is desired to test the travel of roll 1, for example, between the time that the machine is shut down and the actual stopping of said roll, the marking device is mounted upon its supporting tripod, as indicated, and adjusted so that pencil 36 contacts the roll with the solenoid deenergized but rises slightly from the roll upon energization of the solenoid. A suitable strip of paper 58 may be placed tightly around roll 1 adjacent the pencil so that the desired marking may if desired be had upon the paper, which will not only more clearly indicate the roll travel but will also be adapted to filing purposes. It will be apparent, however, that the marking may be made upon the horizontal roll 1 in the manner previously indicated. The conductor-carrying cable leading from the switch may then be connected to the marking device by means of one plug 42, and the source of electrical energy being used may be connected to the device in like manner by means of the other plug 42.

Assuming that the mixing machine is in operation, cradle switch 21 will, of course, be closed and the solenoid of the marking device will be energized. The pencil will, therefore, be disposed a slight distance from roll 1. Assuming now that the machine is stopped by moving one of the horizontal rods 20, for example, switches 19 will be opened to stop motor 16 and apply the brake through the medium of solenoid 13. The machine then immediately starts to slow down and come to rest. Simultaneously, however, with the opening of switch 19, switch 21 is likewise opened and deenergizes the solenoid of the marking device. Spring 39, is, therefore, permitted to drive the pencil against the roll or paper 58 and to hold the pencil thereagainst. The pencil will, of course, indicate by means of a line the extent of travel of the roll from the time the machine is shut down until the brake actually stops the same. In this manner, the travel of the roll may be measured very accurately.

Obviously, the device provided by my invention is simple in construction but operates in an efficient manner to accomplish the desired end. An important feature of the device is that is can be readily disconnected and carried about in a convenient manner. It will, therefore, be apparent that such a device will find ready application in the testing of machines of the character indicated and disclosed. Since there are comparatively few and simple parts in the device, there is little danger of it getting out of order.

Various changes and modifications in the device of the invention may, of course, be made without departing from the spirit of the invention. For example, switch 21 may be mounted upon any suitable element of the machine which functions to shut down the same, although for the sake of accuracy, it is necessary that the switch open simultaneously with the shutting down of the machine. Such changes, therefore, as come within the scope of the appended claims are contemplated, and the invention is only to be limited by the scope of the claims.

I claim:

1. Means for measuring the travel of a machine part after said machine has been rendered inoperative comprising a portable electrically operable marking device adapted for disposition adjacent said part, and a portable switch adapted for mounting on and control by a control element of said machine for rendering said marking device effective to mark said part simultaneously with the rendering inoperative of said machine.

2. Portable testing apparatus for measuring the travel of a machine part from the time said machine is shut down until it stops, comprising a portable electrically operable marking device having means for detachable electrical connection thereto, a portable support for said device, whereby said device may be positioned adjacent said machine part to engage the same, a portable switch adapted for removable mounting upon a control element of said machine so as to operate simultaneously with said element, a source of electrical energy, and detachable electrical conductors for connecting said switch and said source to said marking device.

3. Means for measuring the travel of a machine part after said machine has been rendered inoperative comprising a portable electrically operable marking device adapted for disposition adjacent said part, and a portable switch adapted for mounting in operative association with and control by a control element of said machine for rendering said marking device effective to mark said part simultaneously with the rendering inoperative of said machine.

4. Portable testing apparatus for measuring the travel of a machine part from the time said machine is shut down until it stops, comprising a portable electrically operable marking device having means for detachable electrical connection thereto, a portable support for said device, whereby said device may be positioned adjacent said machine part to engage the same, a portable switch adapted for mounting in operative association with a control element of said machine so as to operate simultaneously with said element, a source of electrical energy, and detachable electrical conductors for connecting said switch and said source to said marking device.

JOSEPH W. THROPP.